United States Patent [19]

Linder

[11] Patent Number: 4,836,785
[45] Date of Patent: Jun. 6, 1989

[54] DEVICE FOR LOCATING A DETAIL

[76] Inventor: Klaus Linder, Papenstrasse 48, D-2000 Hamburg 76, Fed. Rep. of Germany

[21] Appl. No.: 110,984

[22] Filed: Oct. 21, 1987

[30] Foreign Application Priority Data

Oct. 21, 1986 [DE] Fed. Rep. of Germany ....... 3635654

[51] Int. Cl.[4] .............................................. G09B 29/10
[52] U.S. Cl. .................................................... 434/153
[58] Field of Search ......................................... 434/153

[56] References Cited

U.S. PATENT DOCUMENTS

| 1,389,293 | 8/1921 | Bridwell | 434/153 |
| 2,516,569 | 7/1950 | Harris | 434/153 |
| 3,328,899 | 7/1967 | Stewart | 434/153 |

FOREIGN PATENT DOCUMENTS 2552908  4/1985  France ...................... 434/153

Primary Examiner—William H. Grieb
Attorney, Agent, or Firm—Cushman, Darby & Cushman

[57] ABSTRACT

The device facilitates the quick location of a wanted detail depicted on information material, which is divided into at least two grid squares by a large-scale grid of lines at an angle to each other. At least one of these grid squares contains the wanted detail. A fine division is provided on at least one of these lines and an indicator unit, which extends crosswise to the line across at least one grid square of the large-scale grid, is movably disposed along the finely divided line. The indicator unit is disposed as at least one thread-like line. At least two of the thread-like lines intersect at the same angle as the lines defining a grid square. Two of the intersecting thread-like lines are movably disposed independently of each other on each of a line associated to each of a line.

4 Claims, 5 Drawing Sheets

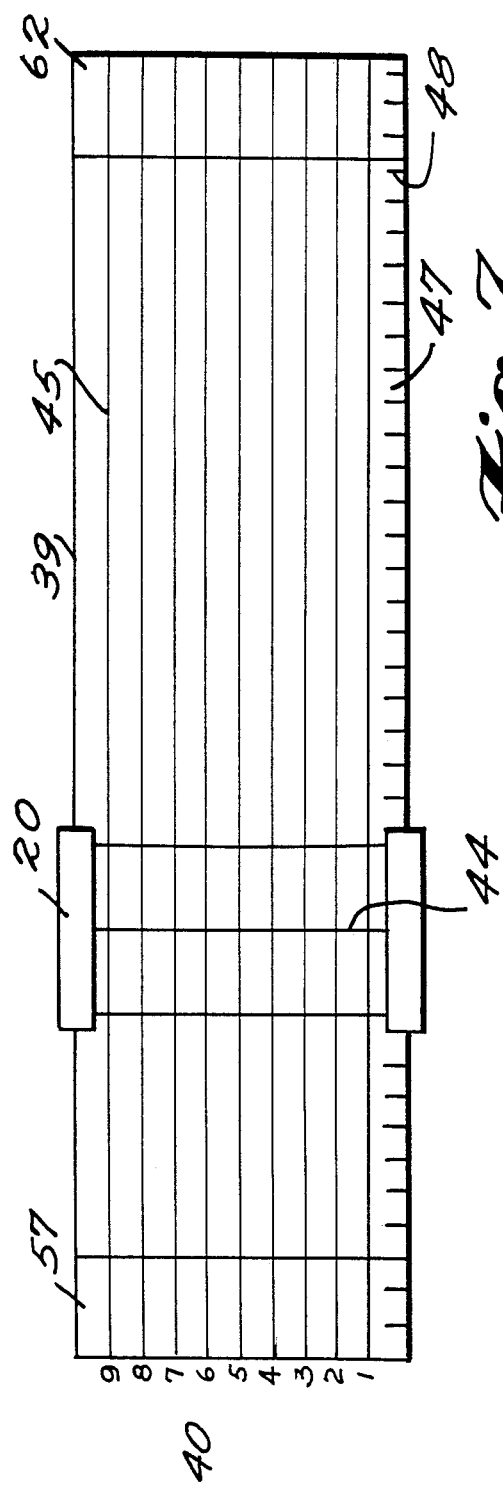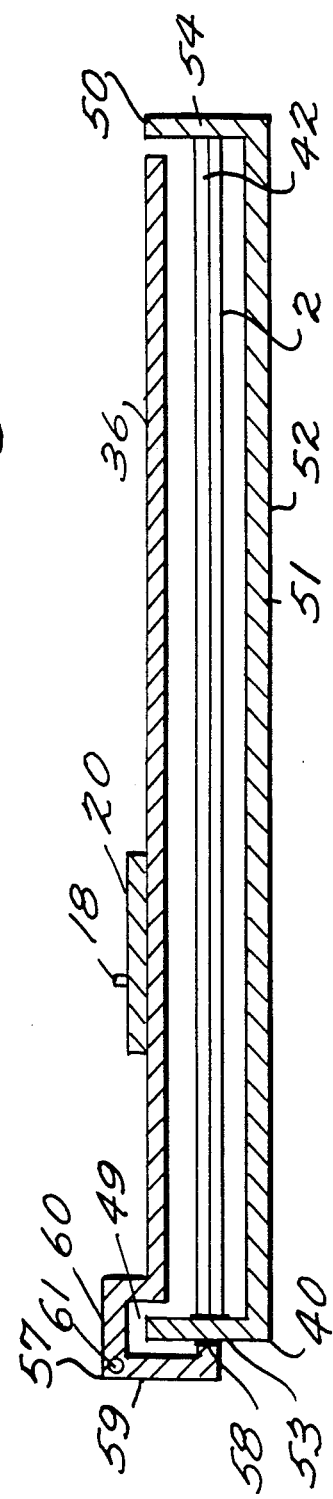

DEVICE FOR LOCATING A DETAIL

The invention relates to a device for locating a detail depicted on information material which is divided into at least two units of orientation by a large-scale grid of lines at angles to each other, at least one of which contains the detail.

Such devices are used particularly for reading maps and road maps. They are embodied, for example, as lamps which are directed unto the information material. By means of such a lamp it becomes possible to illuminate the information material sufficiently. The illumination makes it easier to locate the details depicted on the large-scale grid on the information material. The large-scale grid permits an orientation over a relatively large area on the information material. However, in many cases a time-consuming search for the detail depicted is required with the large-scale grid. This waste of time becomes particularly irritating in the case of a driver who has little time available in traffic to find the street he is looking for.

It is therefore an object of the present invention to improve the previously identified device such that with its aid the wanted detail can be quickly located.

This object is attained by the invention by providing a fine division on at least one line and to movably dispose a locator unit along the finely divided line, which extends crosswise to the line across at least one square of the large-scale grid.

This unit can be slid along the line to a point of the fine division where the wanted detail can be located. In this manner a detailed orientation on the information material becomes possible without the need to cover it with a small-scale grid system. Such a grid system would obscure the information material very much, because a plurality of lines are required which overlap the details shown on the information material in such a way that it finally becomes difficult to determine whether a particular line represents a small-scale grid line or the wanted detail. In contrast to this the device of the invention makes it possible to only employ a large-scale grid within which locating of details is made easier by the fine division of the lines.

In accordance with a preferred embodiment of the invention the locator unit is provided in the form of a thread-like line. This thread-like line can be moved over the large-scale grid without obscuring the view of the details of the information material. Even small details can be located, because they are not obscured by a grid line.

Further details of the invention ensue from the subsequent extensive description and the attached drawings in which preferred embodiments of the invention are shown in the form of examples.

FIG. 6 is a top view of a guide, FIG. 7 is a cross section of a device along the line VII—VII in FIG. 4.

Figure 1:
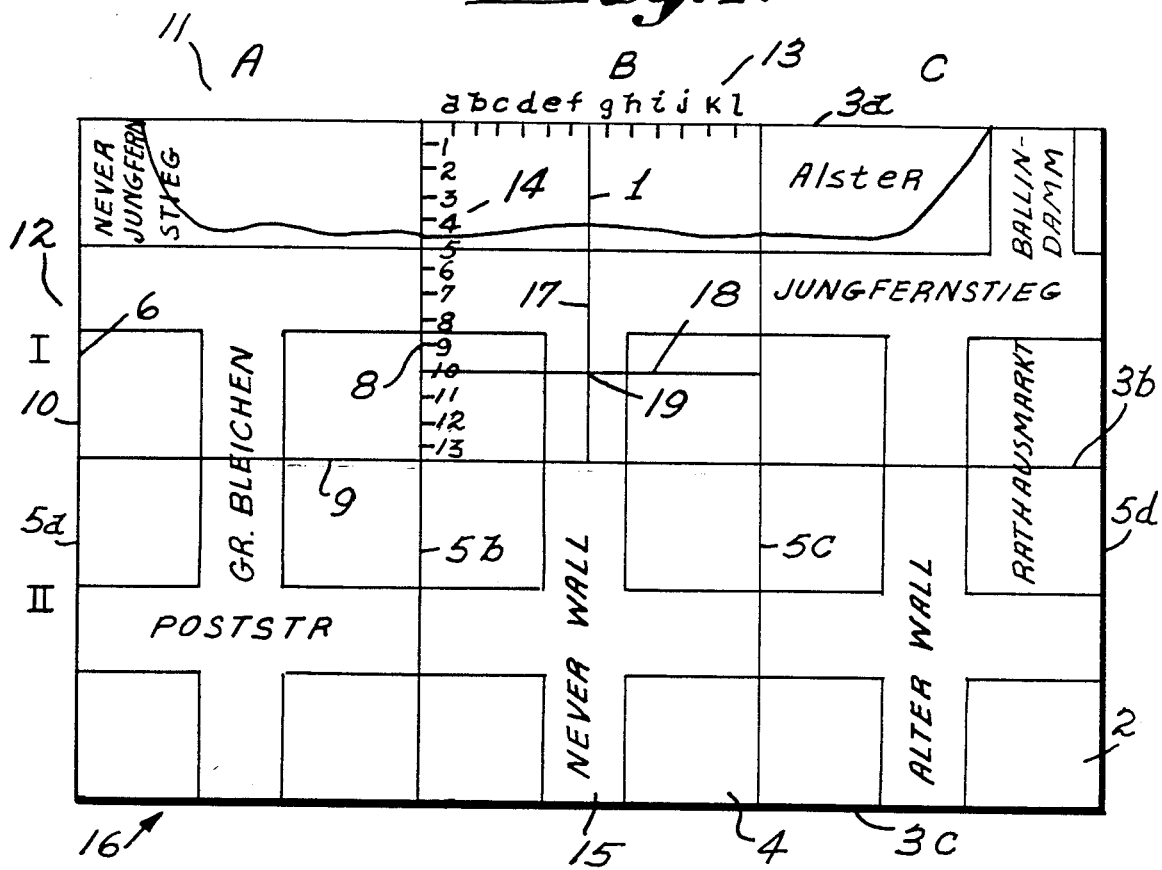
FIG. 1 is a top view of a street map with the device resting thereon.
Figure 2:
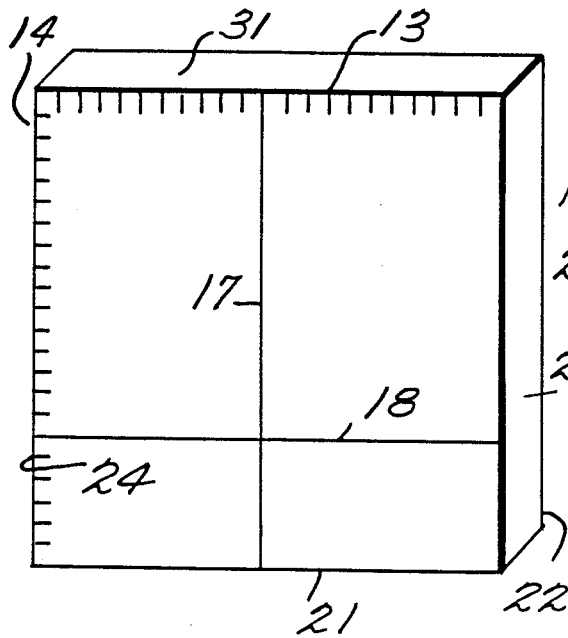
FIG. 2 is a spatial view of a base with two intersecting lines.
Figure 3:
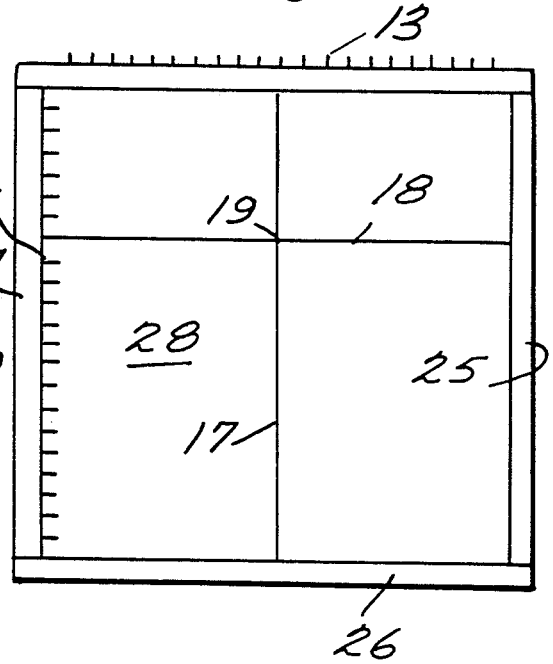
FIG. 3 is top view of another base with two intersecting lines.
Figure 4:
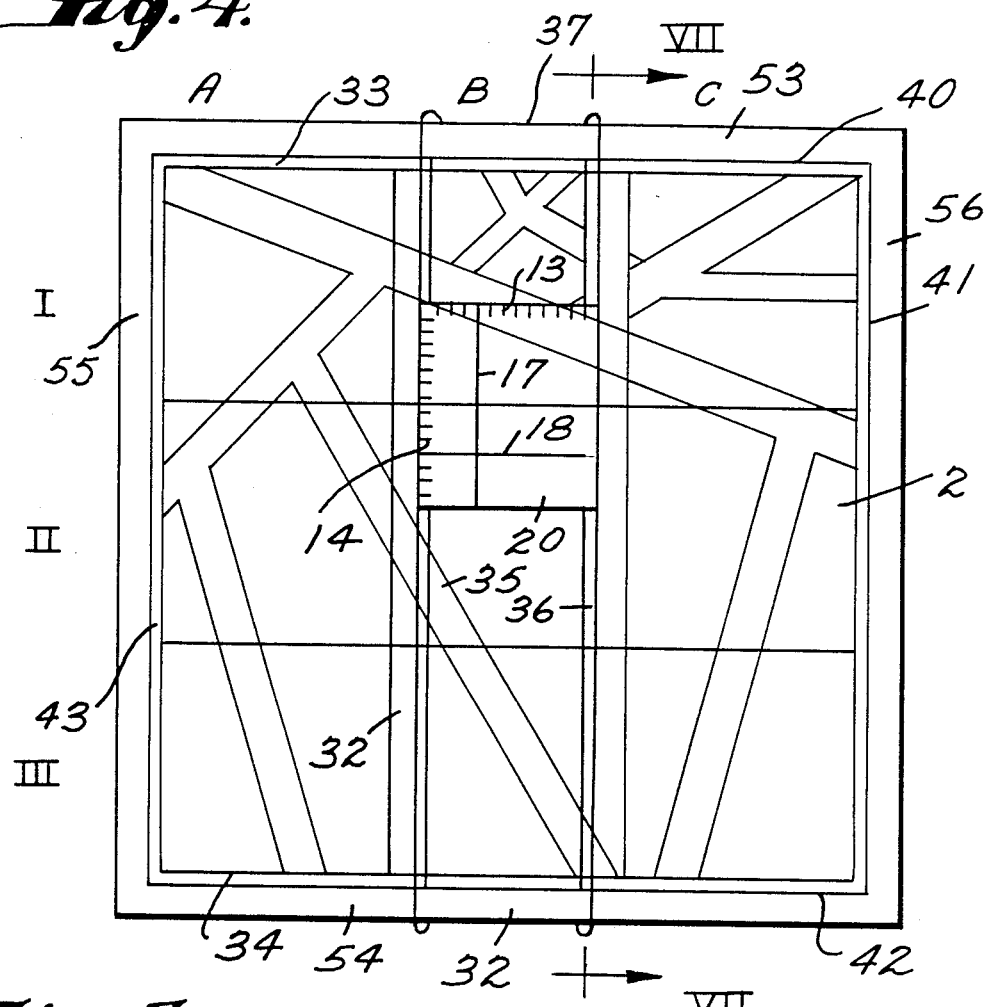
FIG. 4 is a top view of another street map with the guide resting thereon and with the base sliding on it.
Figure 5:
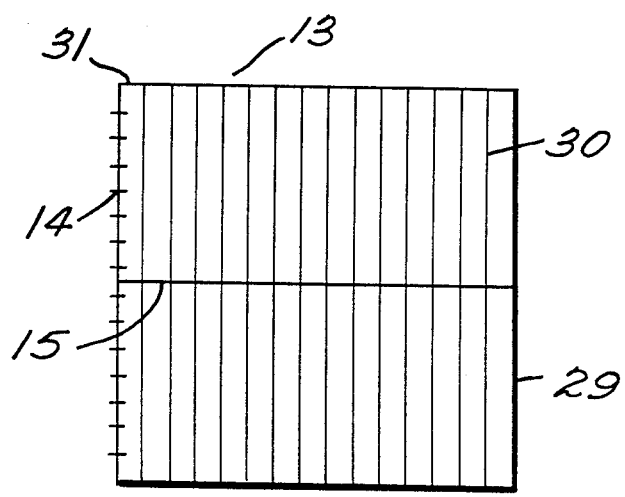
FIG. 5 is a top view of another base.
Figure 8:
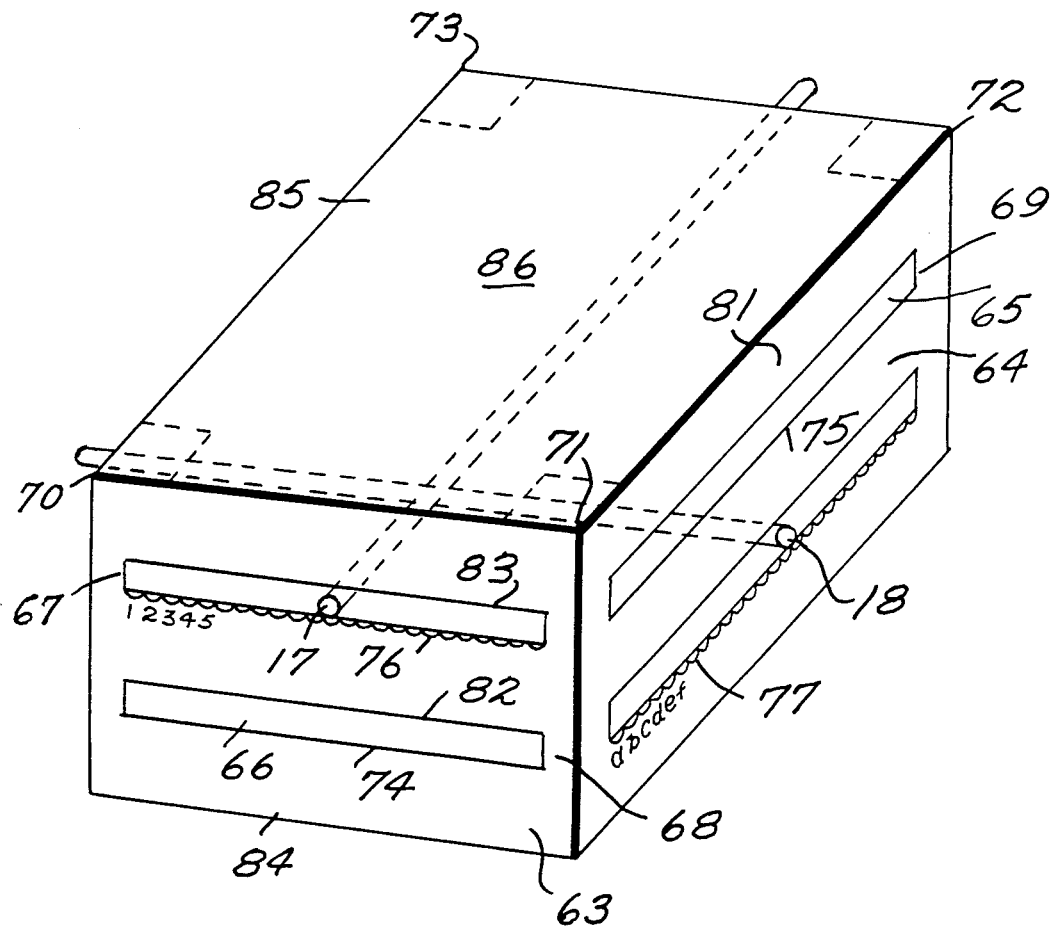
FIG. 8 is a spatial view of a base consisting of a plurality of layers.
Figure 9:
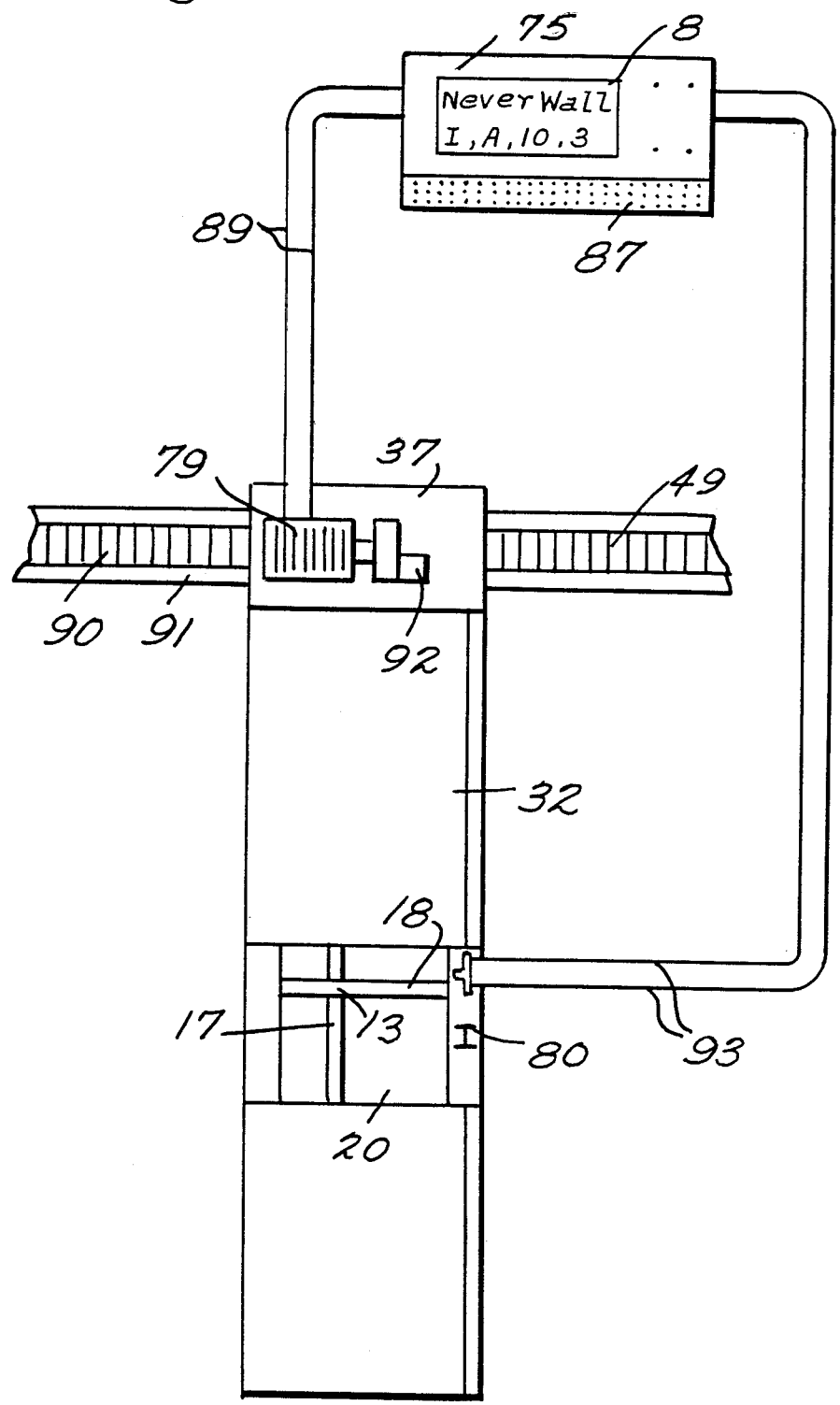
FIG. 9 is a system sketch of a device controlled by a computer.

A device mainly consists of an indicator unit (1) movably disposed crosswise to its longitudinal direction on a street map (2). This indicator unit (1) is provided in the form of a thread-like line movable along a line (3). This line (3) is delimited by a large-scale grid (4) printed on the street map (2) and having lines (3a, 3b, 3c) at approximately even distances which define it. The lines (3a, 3b, 3c) extend approximately horizontally and are intersected by vertical lines (5a, 5b, 5c, 5d). The horizontal lines (3a, 3b, 3c) are at approximately right angles to the vertical lines (5a, 5b, 5c, 5d). One grid square (10) each of the street map (2) is disposed between four each intersecting partial lengths (6,7,8,9,). The grid squares (10) together form the large-scale grid (4). The individual grid squares are identified with the aid of identifiers (11,12), one of which is assigned to a row of grid squares (10) disposed vertically below each other, while the other identifier (12) is assigned to a row of grid squares (10) arranged horizontally next to each other. For example, for the grid squares disposed vertically below each other, upper case letters of the alphabet could be used as identifiers (11), while Roman numerals could be used as identifiers (12) for the row of grid squares (10) arranged in a horizontal direction.

The lines (3,5) are provided with a fine division (13,14). The fine division of the lines (3) extending in a horizontal direction could consist of lower case letters, for example, while the fine division (14) of the lines (5) extending in a vertical direction could consist of Arabic numerals. The fine division (13,14) can be arranged in such a way that its respective count starts at the begin of each grid square (10). In accordance with this, each partial length (6,7,8,9) of the lines (3,5) can, for example, start in the horizontal direction with the lower case letter "a" and in the vertical direction with the number "1". If the partial lengths (6,7,8,9) are of equal size, the fine divisions (13,14) end with numbers or letters, for example, "m" or "13".

The indicator unit (1) is movably disposed along at least one horizontal line (3a, 3b, 3c). It is placed on a point of the fine division (13), for example the letter "g", in accordance with the detail (15) to be located on the street map (2), e.g. the street "Neuer Wall". It is now possible to search along the indicator unit (1) for the wanted detail (15). The wanted detail (15) is located at a particular spot of the indicator unit (1). All details (15) of the street map (2) are contained in a list not shown here. This list not only contains the identifiers (11,12) of the large-scale grid (4) for each detail (15), but also the fine divisions (13,14) by means of which the details (15) can be quickly located. In this connection it is conceivable to let the fine divisions (13,14) begin in each individual grid square (10) with, for example, the letter "a" or the number "1", as shown in FIG. 1. However, it is also possible to chose continuing identifiers for the lines (3,5) along their length extending across the entire street map (2), so that the fine divisions (13,14) of a succeeding grid square (10) start with a letter or number sequentially following the letter or number with which the preceding grid square (10) ended. Depending on the size of a section (16) of a street map (2) to be viewed, the identification of respective lines (13,14) extending directly along the edge of the section (16) is sufficient. In this case the indicator unit (1) must be so long that it extends crosswise across the entire section (16). If, however, each individual grid square (10) is to be provided with a fine division (13,14) on at least a partial length (6,7,8,9) which delimits it, a length of the indicator unit (1) corresponding to the size of the grid square (10) is sufficient. With the advantage of short indicator units (1) goes a disadvantage arising out of a reduction in the clarity of the street map (2) because of the large amount of fine divisions (13,14).

To exactly determine the position of a wanted detail (15), the indicator unit (1) practically consists of a cross formed by two intersecting lines (17,18). While the one line (17) extends in a vertical direction and is movably disposed along the fine division (13) extending in a horizontal direction, the other line (18) extends in a horizontal direction and is movably disposed along the fine division (14) extending in a vertical direction. By means of a corresponding coordination of identifiers (11,12) of the large-scale grid (4) and the fine divisions (13,14) with a wanted detail (15) in the list not shown, an intersection point (19) formed by the lines (17,18) can be located directly by moving the vertically extending line (17) to a point indicated in the list, for example the letter "g" of the fine division (13), while the horizontally extending line (18) is moved to the designated point of the fine division (14) extending in a vertical direction. The point of intersection (19) now exactly indicates the wanted detail (15). The coordination of the identifiers (11,12) or the fine divisions (13,14) with the details (15) can be made in the list not shown such, that for example in connection with streets, the intersection point (19) lies approximately in the center of a street extending through the section (16) when the coordinates resulting from the list are selected.

Furthermore, the fine division (13,14) can also be provided on a base (20) which rests on the street map (2). For practical reasons the base (20) is of a size corresponding to the dimensions of each grid square (10). The lines (17,18) are movably disposed on the base (20). The base (20) is disposed along the partial sections (6,7,8,9) of a grid square (10) with its defining edges (21,22,23,24). Now the lines (17,18) can be shifted on the fine divisions (13,14) of the base (20) in accordance with the information obtained from the list not shown.

For practical reasons the base (20) is provided as a magnifying glass. It can consist, for example, of transparent plastic made into a magnifying glass. By means of this construction of the base (20) it is possible to also exactly locate small details (15) in respect to their disposition on the street map (2).

The base (20) can also consist of three layers (63,64,81) disposed vertically underneath each other. Between the layers (63,64,65) are disposed spaces (65,66), which are limited on the one side by the upper end surface (74,75) of the respectively lower layers (63,64) and by the lower end surfaces (82,83) of the respectively upper layers (81,64). The end surfaces (74,75; 82,83) are approximately parallel to each other. The spaces (65,66) have a distance between the respectively lower end surface (82,83) and the upper end surface (74,75) which is sufficient to move a line (17,18) within the space (65,66). The upper and lower end surfaces (82,83; 74,75) which define the spaces (65,66) extend approximately parallel to a bottom surface (84) with which the base (20) rests on the street map (2).

The individual layers (63,64,81) are kept in position by spacers (67,68,69), one of which can be disposed in each corner (70,71,72,73) of a rectangularly shaped base (20). It is possible to draw these spacers in the form of, for example steel bolts, through a bore penetrating the corners (70,71,72,73) and to connect the layers (63,64,81), which can be separated from each other, by screwing them together. Such a construction of the base (20) has the advantage that the end surfaces (74,75; 82,83) can be inexpensively made as long as the layers (63,64,81) are separated from each other. However, it is also conceivable to make the base (20) of a block containing the three layers (63,64,81) and to provide the spaces (65,66) in the form of slits in the block. In this case it is important to make sure that the end surfaces (74,75; 82,83) are carefully made so that the entire block forming the base (20) remains transparent to the degree that the street map (2) can be seen through it. In a practical manner the block is made with its surface (85) opposite the bottom surface (74) arched, so that the base (20) forms a magnifying glass enlarging the details (15).

If the spaces (65,66) are in the form of slits, they can extend through the block which constitutes the base (20) in directions at right angles to each other. The width of each slit is narrower than the total width of the base (20), so that the individual layers (63,64,81) are connected with each other by edge areas extending on both sides of each of the two slits. In this case there is no need for providing spacers (67,68,69).

In all cases the width of the slits is to be chosen such that it corresponds to the dimensions of a grid square (10). In this manner it is possible to maintain a viewing area (86) either between the edge areas or the spacers (67,68,69) the size of which corresponds to a grid square (10). Thus the base (20) must be made of such size that either the edge areas of the individual slits or the spacers (67,68,69) lie outside of the grid square (10) when the base (20) is placed on a grid square (10).

Grooves (76,77), parallel to each other, can extend through the upper end surfaces (74,75) in the direction of the lines (17,18) extending through the spaces (65,66). These grooves (76,77) have a cross section large enough to permit the running of the lines (17,18) within the grooves (76,77). The grooves (76) of one space (65) extend at the same angle to the grooves (77) of the other space (66) as the lines (3,5) defining the large-scale grid (4). Generally the grooves (76,77) will be located on different levels, but will be at right angles to each other. In this manner the lines (17,18) can extend independently of each other exactly in the spaces (65,66), thus making possible an exact reading of the intersection point (19) through the viewing area (86).

The device can also be constructed such that a guide (32) extends across the street map (2) which, for example, extends from an upper edge (33) extending in a horizontal direction, to a lower edge (32), limiting the street map (2) at its end opposite the upper (33). This guide (32) can consist, for example, of two rails (35,36) running approximately parallel to each other and extending crosswise across the street map (2). These two rails (35,36) are connected with each other via lateral connectors (37,38) which extend approximately parallel to the upper edge (33) or the lower edge (34). The distance of the rails (35,36) from each other can correspond to that of two vertical lines (5c or 5b). However, it is also possible to select different distances between the two rails (35,36). The rails (35,36) are movably disposed along the upper edge (33) and lower edge (34) crosswise to their longitudinal direction. They can be moved in a horizontal direction across the entire street map (2).

A base (20) is disposed movably in a vertical direction on the rails (35,36). The fine divisions (13,14) are provided on this base (20). The lines (17,18) can be moved along these fine divisions (13,14). By means of this embodiment of the invention it is possible to assure a relatively secure placement of the base (20) on the street map (2). Unwanted displacement of the base (20) in respect to the street map (2) is largely prevented because neither can the guide (32) accidentally slide along the upper edge (33) nor can the base (20) along the rails (35,36). The base (20) movably seated on the rails (35,36) can have any of the embodiments so far described.

The guide (32) can extend across the street map (2) either in a vertical or a horizontal direction. Correspondingly, the base (20) is movably disposed in respect to the street map (2). Moreover, the guide (32) can also be in the form of a ruler (39) which is disposed along the respective edges (40,41,42,43) in respect to the street map (2). This ruler (39) is made of a tranparent material. The base (20) is movably disposed on it. This base (20) consists of either a frame (25), surrounding an open space (28), or of a transparent material. Either the ruler (39) or the base (20) can be embodied as a magnifying glass. It is conceivable to provide the base (20), as already described, along its edges (21,22,23,24) with the fine divisions (13,14). The lines (17,18) are movably disposed along these fine divisions (13,14).

It is also conceivable to provide only one line (44) on the base (20) which extends crosswise to the longitudinal direction of the ruler (39). Additionally, hairlines (45) are engraved on the ruler (39) running parallel to each other in the longitudinal direction of the ruler (39). These hairlines (45) have identifiers (46) at least at one end, which correspond to the fine division (14). The ruler (39) preferably but not exclusively is of a width corresponding to that of a grid square (10). Furthermore, the ruler (39) is also provided with a fine division (47) extending in its longitudinal direction. This fine division (47) has gradations (48) each one of which can be brought into agreement with the line (44) engraved on the base (20).

Depending on its disposition, the ruler (39) can be slid either along the vertical edges (41,43) or along the horizontal edges (40,42) until it corresponds to the identifier (11 or 12) of the large-scale grid (4). These identifiers (11,12) are associated with the wanted detail (15) in the list not shown. Then the base (20) is moved in the longitudinal direction of the ruler (39) until the line (44) corresponds to a gradation (48) of the fine division (44). It is now possible to locate the wanted detail (15) along the line (44). It is located on one of the hairlines (45) the identifier (46) of which can be taken from the list not shown.

However, it is also possible to make the ruler (39) without hairlines (45). In this case the ruler (39) only serves as a guide (32) for the base (20) which, in turn, is provided with lines (17,18) movable on it. In this case the base (20) has the dimensions of a grid square (10) for all practical purposes and, as described, is provided along its edges (21,22,23,24) with a corresponding fine division.

Guide edges (49,50) extending along the edges (40,41,42,43) can be provided for containing the guide (32). These guide edges (49,50) can define an open box (51) having a bottom (52) as base for the street map (2). This bottom (52) is limited on its two opposite ends by walls (53,54), which contain the bottom (52) at approximately right angles, and on the upper sides of which, away from the bottom (52), the guide edges (49,50) are provided. Additionally, lateral walls (55,56) can be provided for stiffening the box (51), which define the box (51) laterally to the longituinal direction of the walls (53,54). The street map (2) is located within the walls (53,54) and the lateral walls (55,56).

The guide (32) is moved across the street map (2) in the guide edges (49,50). For this purpose the guide (32) has a guide groove (57) on one of its ends which extends over the guide edge (49). This guide groove (57) extends over the guide edge (49) in the shape of the letter U and can engage with its end (58), located outside of the box (51), a mount (59) fastened on the wall (54) outside of the box (51) and extending in the longitudinal direction of the wall (54). The end (58) runs inside the mount (59) and in this manner prevents the annular groove (57) from slipping off the guide edge (49).

The guide groove (57) has, in its yoke (60) running on the guide edge (49), a swivel hinge (61) extending approximately along the guide edge (49). The guide (32) is pivotably supported on this swivel hinge (61). The guide (32) can be moved off the street map (1) by pivoting. In this way the latter can be inserted into or taken out of the box (51). The swivel hinge (61) is disposed in such a way that the guide (32) firmly rests on the street map (2).

Additionally, the guide (32) can also have a guide groove (62) on its end oriented towards the wall (54). This grove (62) runs on the guide edge (55). However, it is sufficient that the guide (32) rest only with a guide groove (57) on the guide edge (49).

The street map (2) is inserted into the box (51). It is practical to use a fold of the street map (2), on which a certain wanted detail (15) lies, between the walls (53,54) and lateral walls (55,56). If necessary, a scale is chosen for the street map (2) permitting the placement of the entire street map (2) within the box (51).

Then the guide (20) is pivoted around the pivot hinge (61) in such a way that the guide (32) firmly rests on the street map (2). Next it is determined from the list not shown, in which grid square (10) the wanted detail (15) is located. In accordance with the information taken from the list, the guide (32) is moved to the grid squares (10) lying vertically below each other, the identifier (11) of which was read out from the list. Then the identifier (12) is taken from the list for which the base (20) is set. However, if the hairlines (45) longitudinally extend across the entire ruler (39), it is not necessary to read-off the identifier (12) for the large-scale grid (4). Instead, the identifier (46) for the hairline (45) to be located, as well as the fine divisions (47) for the setting of the line (44) firmly engraved in the base (20) can be taken from the list. Once the base (20) has been moved on the ruler (39) corresponding to the fine division (47), the wanted detail (15) can be read off at the intersection of the hairline (45), provided with the indicated identifier (46), with the line (44).

Finally, it is possible to store the details (15), the identifiers (11,12) and the fine division (13,14) in a computer (78). In this computer (78) the details (15) are sorted according to their characteristics, for example by their first letters. The details (15) can be called up via a keyboard (87) of the computer (78). Then the detail (15) with the associated identifiers (11,12), as well as the fine division (13,14), appear on a screen (88).

Additionally, the computer (78) can be connected via control lines (89,90) with a servo motor (79) driving the guide (32). This guide (32) can, for example, be movably disposed on a rack (90) extending on one of the guide edges (49). This rack (90) is oriented with its teeth (91) in the direction of a lateral connector (37) of the guide (32). A pinion (92) is pivotably disposed on the lateral connector (37) and extends with its teeth into the rack (90). This pinion is driven by the servo motor (79) mounted on the lateral connector (37) which, corresponding to the detail (15) called out from the computer (78), displaces the guide (32) to an extent on the guide edge (49) until the guide (32) is located above this detail (15).

Additionally, the computer (78) is connected via another control line (93) with a drive motor (80), which moves the base (20) along the guide (32). Corresponding to the detail (15) called out from the computer (78) the base (20) is moved along the guide (32) to an extent until the intersection point (19) firmly fixed on the base (20) is located directly above the detail (15). In this manner it is possible to determine via the computer (78) not only the association of the identifiers (11,12) or the fine division (13,14) with the detail (15), but in addition the control signals originating in the computer (78) can also serve to locate the detail (15) on the street map (2). Of course, it is impossible to dispense with an exact coordination of the street map with the guide edge (49).

The device described can be used in connection with street maps and maps of every size. Additionally, it is also possible to use the device for the location of other details (15), for example to read technical drawings in which certain details (15) have been exactly fixed in regard to the area of the drawing.

I claim:

1. A device for locating a detail depicted on information material of the type having at least two edges extending at a right angle to each other on a flat sheet which is divided into at least two units of orientation by a large scale grid of lines, at least one of which contains the detail, the device comprising a first element having at least one portion for engaging one of said two edges of the sheet, said first element including spaced apart parallel sides and another portion at an end of said first element opposite said one portion, said first element having a scale of indicia located along one of said sides, said first element having selected width and length dimensions, a second element having a length dimension smaller that said selected length dimension of said first element and movably supported on said sides of said first element for movement in a direction parallel to said sides of said first element, said second element being made of a transparent material and including two lines extending at a right angle to each other, at least one of said two lines being movable with respect to the other, said first element having a scale of indicia thereon associated with the movable one of said two lines.

2. The device as claimed in claim 1 wherein said second element comprises at least two layers, one overlaying the other, with the upper layer including the movable line.

3. A device in accordance with claim 2, characterized in that said second element has a space provided between said layers.

4. The device as claimed in claim 1 wherein said second element is connected to drive means for moving said second element along said sides, said drive means being controlled by computer means responsive to user input to locate a selected detail on the sheet.

* * * * *